March 2, 1965  R. J. LOYD  3,171,274
SAMPLING METHOD FOR GAS CHROMATOGRAPHIC ANALYZER
Filed June 3, 1960
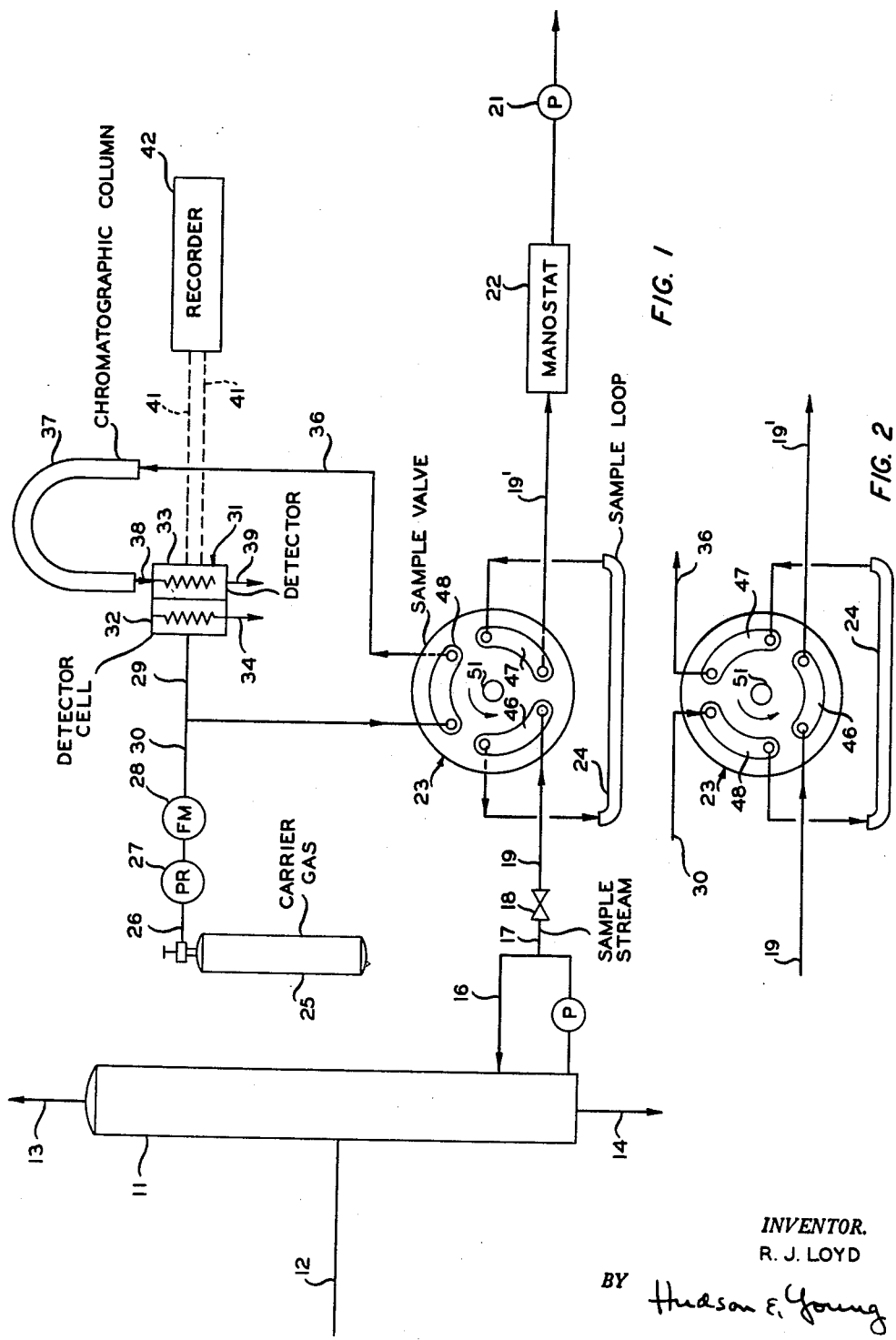
INVENTOR.
R. J. LOYD
BY Hudson E. Young
ATTORNEYS United States Patent Office 3,171,274
Patented Mar. 2, 1965

3,171,274
SAMPLING METHOD FOR GAS CHROMATO-
GRAPHIC ANALYZER
Robert J. Loyd, Bartlesville, Okla., assignor to Phillips
Petroleum Company, a corporation of Delaware
Filed June 3, 1960, Ser. No. 33,660
2 Claims. (Cl. 73—23.1)

This invention relates to gas chromatography, also known as vapor phase chromatography or vapor fractometry. Particularly, it relates to a sampling system and method for gas chromatographic analysis.

In recent years, the separation and analysis of gases and volatile liquids by means of gas chromatography has received widespread attention and application. Briefly, the gas chromatographic analytical procedure involves introducing a gas or vapor into a column packed with granular active adsorbents such as activated alumina or a stationary liquid phase coating on finely divided inert solids such as kieselguhr. The constituents of the sample are separated as they are carried through the packed column by an elutant or carrier gas, such as helium, and the constituents are detected by a sensitive detector as they pass from the column. The constituents emerging from the column are detected through a characteristic property, such as thermal conductivity, density, refractive index, infrared absorption or the like, to identify the several constituents and measure the relative amounts thereof. There are, however, some inherent features of the gas chromatographic analytical procedure which limit the usefulness and applicability thereof.

In gas chromatography the material sampled and analyzed must be in the gaseous or vaporous state. If the material is normally a liquid, it is customary to vaporize it and carry it in this state through the chromatographic column with the carrier gas. However, many liquids, such as plastic materials, are difficultly volatilizable under certain conditions. Many of these liquids tend to polymerize when an attempt is made to vaporize such liquids at the pressures and temperatures at which the chromatographic procedure is normally carried out. The packed column may become blocked and require changing. As such, the chromatographic analysis of such liquids is not accurate, if not entirely unfeasible. Heretofore, such liquids necessarily had to be subjected to some type of preliminary treatment such as distillation or solvent extraction, or analyzed by other analytical procedures.

For example, styrene has a boiling point of 146° C. at atmospheric pressure (760 mm. of mercury). Chromatographic columns are often operated at temperatures around 60° C. and at pressures about atmospheric or greater than atmospheric. Styrene polymerizes at temperatures above 80° C. Thus, when an attempt is made to chromatographically analyze styrene, or a liquid process stream containing styrene as a key constituent, by vaporizing the same, for example by means of a flash heater, the styrene polymerizes and it is not possible to accurately and feasibly subject the sample to chromatographic analysis.

Accordingly, an object of this invention is to improve the gas chromatographic analysis of liquids which are difficultly vaporized by conventional chromatographic systems. Another object is to vaporize volatile materials, such as styrene which tends to polymerize when subjected to ordinary volatilization, by an improved method and apparatus, so as to make the chromatographic analysis of such material accurate and feasible. Another object is to provide an improved sampling system and method for the chromatographic analysis of volatile liquids. Further objects and advantages of this invention will be apparent to those skilled in the art from the following discussion, appended claims, and accompanying drawing in which:

FIGURE 1 schematically illustrates a chromatographic system with one embodiment of the improved sampling system of this invention associated therewith; and FIGURE 2 schematically illustrates a portion of FIGURE 1.

Briefly, I have found that difficultly vaporizable liquids, or process streams containing difficultly vaporizable key constituents, such as styrene, can be satisfactorily volatilized for sampling and analysis by gas chromatographic analytical procedures. According to my invention, the liquid sampling stream is volatilized at a pressure below the normal vapor pressure of the difficultly volatile material at the ambient temperature of the chromatographic system. The resulting vaporized stream is passed to a sampling loop or the like and then it is introduced into a carrier gas stream at atmospheric pressure or pressure greater than atmospheric. The resulting carrier gas-vaporized sample stream is then passed onto a packed chromatographic column for purposes of separating the sample constituents and analyzing the same in a conventional manner.

Reference will now be made to the accompanying drawing for a fuller understanding of my invention.

In FIGURE 1, a conventional fractionator column 11 is illustrated, provided with the usual feed line 12, overhead line 13, and bottoms line 14. Column 11 can be provided with a circulating sample source line 16. It should be understood that this process equipment is merely illustrative since the subject invention is not limited thereto.

According to the subject invention, sample is continuously withdrawn via line 17 from source 16. The liquid sample in line 17 passes through a suitable flashing zone such as a restrictor valve 18 into a reduced pressure line 19. The pressure in line 19 is held by means of vacuum pump 21 and manostat or vacuum regulator 22 at a reduced pressure below the vapor pressure of the difficultly volatile liquid, or constituent under consideration, at the ambient temperature of the chromatographic system. A suitable manostat which can be used is that sold by the Conoflow Corp., Model VH-20, 30" Hg absolute to 1" Hg ab., ±0.1".

The vaporized sample passes through a conventional sample valve 23 into a sample loop 24 of known and determinable volume (e.g., 25 cc.) and thence into a continuation 19' of line 19 to vent or other disposal. During the passage of the vaporized sample through sample valve 23 and sample loop 24, the sample is maintained at the aforementioned reduced pressure at the ambient temperature of the chromatographic system.

A suitable source of carrier gas such as a tank 25 containing an inert gas, e.g., helium, is provided. A line 26 leads into a suitable pressure regulator 27 and flow meter 28, whereby the pressure of the carrier gas is reduced, e.g., to 60" Hg, and its flow controlled, e.g., between 30–200 ml./min. A portion of the carrier gas in line 30 is passed through line 29 to a conventional detector cell generally designated 31. This detector cell 31 can be of conventional design and is preferably, as shown, a thermal conductivity cell having a reference channel 32 and sensing channel 33, both channels being provided with the usual resistors or thermistors. The carrier gas in line 29 passes through the reference channel 32 and thence to vent line 34. The balance of the carrier gas in line 30 is passed through sample valve 23 into the inlet line 36 of a conventional packed chromatographic column 37. The effluent line 38 of the packed column 37 communicates with the sensing channel 33 of detector cell 31 which is also provided wtih a vent line 39. Signals representative of the thermal conductivities measured by detector cell 31 are transmitted by suitable electrical leads 41 to a conventional electronic recorder 42, such as that provided with a strip chart showing the proportions of the various constituents in the effluent flowing by line 38 into detector cell 31.

Sample valve 23 can be any conventional gas sampling valve known to the art, such as the "Sample Apparatus" of U.S. 2,757,541, patented August 7, 1956. As shown in the drawing, the illustrative sample valve is provided with a plurality of depressions or channels 46, 47, 48, each of the latter being provided with a pair of ports communicating with the various sample lines 19, 19' and carrier gas lines 30, 36. The sample valve 23 is illustrated in FIGURE 1 in its charge position. In this position, the vaporized sample in line 19 passes into one of the ports of channel 46 and out through the other port thereof into line 19'. Simultaneously, carrier gas from line 30 passes into one port of channel 48 and out through the other port thereof into column inlet line 36. When the sample valve 23 is in the charge position shown, the chromatographic column 37 is purged with carrier gas and the vaporized sample continuously flowing through sample loop 24 is vented.

FIGURE 2 illustrates sample valve 23 in its sample position, resulting from the counterclockwise rotation of sample valve rotor 51. With the sample valve 23 in its sample position, the channels 46, 47, and 48 occupy the positions shown, the various ports of the sample valve remaining in the same position as shown in FIGURE 1. With the sample valve in its sample position, the vaporized sample passes from line 19 into one port of channel 46 and out through the other port thereof directly into line 19'. In the sample position, the carrier gas from line 30 passes into one port of channel 48 and out through the other port thereof into sample loop 24, sweeping the known and determinable trapped volume of sample therefrom. The carrier gas-sample mixture passes from sample loop 24 into one port of channel 47 and out through the other port thereof into column inlet line 36. The carrier gas-sample mixture is held at atmospheric pressure or thereabove, the partial pressure of the component under consideration being insufficient to condense the same.

Sample valve 23 can be manually rotated, or automatically rotated by means of a suitable timer or programmer, so that the sample stream is cyclically sampled and analyzed in an almost continuous manner. The carrier gas sweeps the vaporized sample onto the packing in the column 37, after which the sample valve 23 returns to its charge position shown in FIGURE 1, during which time the carrier gas causes the elution of the sample in at column 37. The components of the carrier gas-vaporized sample mixture are carried through the column at different speeds, depending on their different affinities for the packing material. The packing material in column 37 tends to hold the constituents of the sample while the carrier gas tends to wash them or pull them through the column. The constituents of the carrier gas-vaporized sample ultimately arrive in the effluent line 38 which is connected to the sensing channel 33 of detector cell 31. Detection of the constituents in the column effluent line 38 is accomplished by the continuous recording of the thermal conductivity of the gas passing thereto. The separation and analysis of the constituents by means ot the chromatographic column is well known to those skilled in the art and need not be further detailed. A suitable chromatographic analyzer which can be used is Perkin-Elmer Vapor Fractometer Model 184.

The sampling system of this invention expands the application of gas chromatography to the analysis of difficultly vaporizable liquids, such as styrene which tends to polymerize when attempts are made to vaporize it by conventional sampling procedures. Other materials which would normally tend to polymerize but can be satisfactorily vaporized and sampled by the practice of this invention representatively include: butadiene; methyl acrylate; dichlorostyrene; 3-chlorostyrene; 4-chlorostyrene; $\alpha$-methyl styrene; 4-methyl styrene; 2-vinylanisole; 3-vinylanisole; 4-vinylanisole; 1,3-divinylbenzene; 2,4-dimethylstyrene; 2,5-dimethylstyrene; 3-ethylstyrene; 4-ethylstyrene; 4-vinylphenetole; 2,4,5-trimethylstyrene; 2,4,6-trimethylstyrene; 4-isopropylstyrene; 2,4-diethylstyrene; and the like.

Various modifications and alterations of this invention will become apparent to those skilled in the art without departing from the scope and spirit of this invention as described herein for illustrative purposes, and the subject invention should not be unduly limited to that set forth herein.

I claim:

1. An improved vaporizing and sampling method for analysis of a liquid which normally tends to polymerize upon heating, which comprises continuously passing a stream of said liquid from a source thereof through a restriction to a zone of reduced pressure to continuously vaporize said liquid at ambient temperature such that said liquid is not polymerized, maintaining the resulting vaporized liquid under a reduced pressure below the vapor pressure of said liquid at ambient temperatures, passing said vaporized liquid to a sampling zone at ambient temperature, in said zone obtaining therefrom a measured sample portion, and passing said measured sample portion in a stream of inert carrier gas at ambient temperature to a packed chromatographic column.

2. The method according to claim 1, wherein said liquid comprises the material selected from the group consisting of butadiene, methyl acrylate, dichlorostyrene, 3-chlorostyrene, 4-chlorostyrene, $\alpha$-methyl styrene, 4-methyl styrene, 2-vinylanisole, 3-vinylanisole, 4-vinylanisole, 1,3-divinylbenzene, 2,4-dimethylstyrene, 2,5-dimethylstyrene, 3-ethylstyrene, 4-ethylstyrene, 4-vinylphenetole, 2,4,5-trimethylstyrene, 2,4,6-trimethylstyrene, 4-isopropylstyrene, and 2,4-diethylstyrene.

References Cited in the file of this patent
UNITED STATES PATENTS

| 2,757,541 | Watson et al. | Aug. 7, 1956 |
| 2,845,136 | Robinson | July 29, 1958 |
| 2,982,123 | Kindred | May 2, 1961 |

OTHER REFERENCES

Analytical Chemistry: "Gas Chromatography," article by E. M. Fredericks et al., vol. 28, No. 3, March 1956, pp. 279–303.

Analytical Chemistry: "Liquid Sample Inlet System for Gas Chromatographs," article by R. E. Davis et al., vol. 29, No. 7, July 1957, pp. 1114–15.